United States Patent
Hirosawa et al.

(10) Patent No.: US 10,422,951 B2
(45) Date of Patent: Sep. 24, 2019

(54) PLANAR WAVEGUIDE

(71) Applicant: MITSUBISHI ELECTRIC CORPORATION, Tokyo (JP)

(72) Inventors: Kenichi Hirosawa, Tokyo (JP); Takayuki Yanagisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/302,032

(22) PCT Filed: Jun. 14, 2016

(86) PCT No.: PCT/JP2016/067653
§ 371 (c)(1),
(2) Date: Nov. 15, 2018

(87) PCT Pub. No.: WO2017/216865
PCT Pub. Date: Dec. 21, 2017

(65) Prior Publication Data
US 2019/0219764 A1  Jul. 18, 2019

(51) Int. Cl.
*G02B 6/122* (2006.01)
*G02B 6/126* (2006.01)
(Continued)

(52) U.S. Cl.
CPC .......... *G02B 6/1225* (2013.01); *G02B 6/126* (2013.01); *G02B 6/1223* (2013.01); *G02F 1/065* (2013.01);
(Continued)

(58) Field of Classification Search
None
See application file for complete search history.

(56) References Cited

U.S. PATENT DOCUMENTS 6,807,353 B1  10/2004  Fleming et al.
7,266,284 B2 *  9/2007  Weiss ............... B82Y 20/00
                                                 385/12
(Continued)

FOREIGN PATENT DOCUMENTS

JP  4-125602 A  4/1992
JP  2004-219998 A  8/2004
(Continued)

OTHER PUBLICATIONS

Extended European Search Report issued in corresponding European Application No. 16 905 420.2 dated May 20, 2019.
(Continued)

*Primary Examiner* — Rhonda S Peace
(74) *Attorney, Agent, or Firm* — Birch, Stewart, Kolasch & Birch, LLP

(57) ABSTRACT

Disclosed is a planar waveguide including: a core (11) which is a flat plate through which light propagates; a cladding (12) which is a flat plate for reflecting the light in a state of being joined to an upper surface of the core (11); and a cladding (13) which is a flat plate for reflecting the light in a state of being joined to a lower surface of the core (11), in which each of the claddings (12) and (13) is a multilayer film in which multiple films made from different materials are layered. As a result, a material having a low index of refraction can be used as the material of the core (11), and the limit on materials usable as the material of the core (11) is relaxed.

6 Claims, 4 Drawing Sheets

(51) Int. Cl.
*H01S 3/03* (2006.01)
*G02F 1/065* (2006.01)
*H01S 3/10* (2006.01)
*H01S 3/063* (2006.01)

(52) U.S. Cl.
CPC .......... *H01S 3/0315* (2013.01); *H01S 3/0632* (2013.01); *H01S 3/10061* (2013.01)

(56) References Cited

U.S. PATENT DOCUMENTS

| | | | | |
|---|---|---|---|---|
| 7,715,677 | B2* | 5/2010 | Helmy | G02B 6/122 |
| | | | | 385/129 |
| 7,901,870 | B1* | 3/2011 | Wach | G02B 5/285 |
| | | | | 430/321 |
| 7,903,338 | B1* | 3/2011 | Wach | G02B 5/289 |
| | | | | 359/588 |
| 2005/0018300 | A1 | 1/2005 | Weiss et al. | |
| 2005/0255619 | A1 | 11/2005 | Negro et al. | |
| 2006/0126992 | A1 | 6/2006 | Hashimoto et al. | |
| 2007/0019919 | A1 | 1/2007 | Bloemer et al. | |
| 2007/0297737 | A1 | 12/2007 | Hashimoto | |
| 2010/0189151 | A1 | 7/2010 | Yanagisawa et al. | |
| 2012/0170604 | A1 | 7/2012 | Yanagisawa et al. | |

FOREIGN PATENT DOCUMENTS

| | | |
|---|---|---|
| JP | 2006-30508 A | 2/2006 |
| JP | 2007-333756 A | 12/2007 |
| WO | WO 2009/016703 A1 | 2/2009 |

OTHER PUBLICATIONS

Hu et al., "Understanding leaky modes: slab waveguide revisited", Advances in Optics and Photonics 1, pp. 58-106 (2009).

International Search Report for PCT/JP2016/067653 (PCT/ISA/210) dated Sep. 20, 2016.

Japanese Office Action dated Apr. 25, 2017 in Japanese Patent Application No. 2016-574191.

West et al., "Properties of the quarter-wave Bragg reflection waveguide: theory", J. Opt. Soc. Am. B, vol. 23, No. 6, pp. 1207-1220, Jun. 2006.

Yeh et al., "Electromagnetic propagation in periodic stratified media. I. General theory", J. Opt. Soc. Am., vol. 67, No. 4, pp. 423-438, Apr. 1977.

* cited by examiner

PLANAR WAVEGUIDE

TECHNICAL FIELD

The present invention relates to a planar waveguide in which claddings are joined to upper and lower surfaces of a core.

BACKGROUND ART

A typical planar waveguide includes a core through which light propagates, a first cladding that reflects the light in a state of being joined to an upper surface of the core, and a second cladding that reflects the light in a state of being joined to a lower surface of the core.

In following Patent Literature 1, a planar waveguide which is configured, by using, as each of first and second claddings, a material whose index of refraction is lower than that of a core, in such a way that light incident upon the core is totally reflected at the interface between each of the first and second claddings and the core is disclosed.

CITATION LIST

Patent Literature

Patent Literature 1: Publication No. WO 2009/016703

SUMMARY OF INVENTION

Technical Problem

Because the conventional planar waveguide is configured as above, light can be confined within the core if a material whose index of refraction is lower than that of the core can be used as each of the first and second claddings. However, in a case in which a material having a low index of refraction is used as the material of the core, taking into consideration the optical characteristics and the physical characteristics, a material of each cladding whose index of refraction is lower than that of the core may not be found. Therefore, a problem is that a material having a low index of refraction cannot be used as the material of the core, and materials each of which can be used as the material of the core are limited.

The present invention is made in order to solve the above-mentioned problem, and it is therefore an object of the present invention to provide a planar waveguide in which a material having a low index of refraction can be used as the material of a core.

Solution to Problem

According to the present invention, there is provided a planar waveguide including: a core which is a flat plate through which light propagates; a first cladding which is a flat plate for reflecting the light in a state of being joined to an upper surface of the core; and a second cladding which is a flat plate for reflecting the light in a state of being joined to a lower surface of the core, in which each of the first and second claddings is a multilayer film in which one or more sets of multiple films made from different materials are layered, wherein film thicknesses of multiple films belonging to an identical set are determined from a relation between wave numbers in the multiple films, and a light path where the light makes a round trip through the multiple films belonging to the identical set, and wherein when a number of films belonging to the identical set is two, the film thicknesses of the two films are expressed by $d_a$ and $d_b$, respectively, vertical components of the wave numbers in the two films are expressed by $k_a$ and $k_b$, respectively, and the light path where the light makes a round trip through the two films is expressed by $l \times \pi$ (l is an integer equal to or larger than 1), the film thicknesses $d_a$ and $d_b$ of the two films are determined to be ones satisfying a following conditional formula:

$$\left(l - \frac{1}{4}\right) \times \pi < (k_a \times d_a) + (k_b \times d_b) < \left(l + \frac{1}{4}\right) \times \pi.$$

Advantageous Effects of Invention

According to the present invention, because the configuration is provided in which as each of the first and second claddings, a multilayer film in which multiple films made from different materials are layered is used, there is provided an advantage of being able to use a material having a low index of refraction as the material of the core.

DESCRIPTION OF EMBODIMENTS

Hereafter, in order to explain this invention in greater detail, the embodiments of the present invention will be described with reference to the accompanying drawings.
Embodiment 1.

Figure 1:
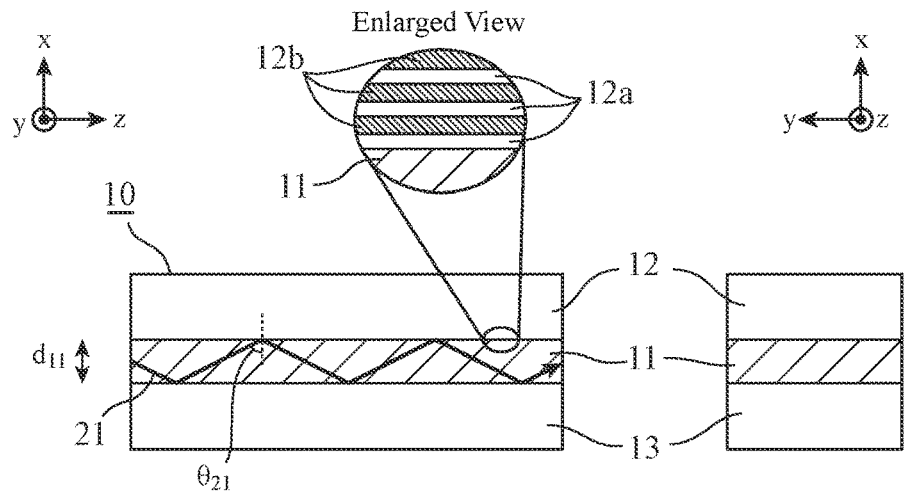
FIG. 1 is a schematic diagram showing a planar waveguide according to Embodiment 1 of the present invention.

FIG. 1 is a schematic diagram showing a planar waveguide according to Embodiment 1 of the present invention.

In FIG. 1, the planar waveguide 10 includes a core 11, a cladding 12, and a cladding 13.

The core 11 is a flat plate through which signal light 21 which is light propagates.

The core 11 is made from glass or the like which is a material transparent to the signal light 21, and, in the example of FIG. 1, the index of refraction of the core 11 is $n_{11}$ and the thickness of the core 11 is $d_{11}$.

In the figure, a direction of the thickness of the core 11 is an x axis, a direction of a side surface of the core 11 is a y axis, and an optical axis which is a propagating direction of the signal light 21 is a z axis.

The cladding 12 which is a first cladding is a flat plate that reflects the signal light 21 in a state of being joined to an upper surface of the core 11.

The cladding 12 is a multilayer film in which multiple films are layered, and, for example, thin films 12a and thin films 12b are alternately layered.

In the example of FIG. 1, although three sets of a thin film 12a and a thin film 12b are layered, one or more sets may just be layered.

The thin film 12a and the thin film 12b are made from different materials, and, for example, two types of dielectric materials are selected from among $SiO_2$, $Ta_2O_5$, MgO, $Nb_2O_5$, $TiO_2$, $CaF_2$, $MgF_2$, etc. which are dielectric materials making it possible to form films, and the thin film 12a and the thin film 12b are made from the two types of dielectric materials.

In the example of FIG. 1, the index of refraction of the thin film 12a is $n_{12a}$ and the index of refraction of the thin film 12b is $n_{12b}$, and the film thickness of the thin film 12a is $d_{12a}$ and the film thickness of the thin film 12b is $d_{12b}$.

Either or both of the indexes of refraction $n_{12a}$ and $n_{12b}$ of the thin films 12a and 12b can be higher than the index of refraction $n_{11}$ of the core 11.

The cladding 13 which is a second cladding is a flat plate that reflects the signal light 21 in a state of being joined to a lower surface of the core 11.

The cladding 13 has a structure in which the cladding 12 is arranged in linear symmetry with respect to a yz plane. Therefore, the cladding 13 is the one in which thin films 12a and thin films 12b are alternately layered, like the cladding 12.

Each of the claddings 12 and 13 has reflectivity of 99% or more when the signal light 21 is incident thereupon from the core 11 at an angle of $\theta_{21}$ (referred to as a "propagation angle $\theta_{21}$" hereafter).

In this Embodiment 1, a case in which the polarization of the signal light 21 is perpendicular to a direction of the thicknesses of the thin films 12a and 12b is referred to as TE (Transverse Electric field) mode, and the polarization in the TE mode is referred to as the TE polarization.

Further, the polarization of the signal light 21 parallel to a plane including both the direction of the thicknesses of the thin films 12a and 12b, and the propagating direction of the signal light 21 is referred to as TM (Transverse Magnetic field) mode, and the polarization in the TM mode is referred to as the TM polarization.

Therefore, when the signal light 21 of FIG. 1 is y-polarized light, the mode is the TE one, while when the signal light becomes x-polarized light, the mode becomes the TM one.

In the planar waveguide 10 of FIG. 1, although a reason will be given later, the signal light 21 can be confined within the core 11 even in a case in which the index of refraction $n_{11}$ of the core 11 is lower than the indexes of refraction $n_{12a}$ and $n_{12b}$ of the thin films 12a and 12b included in the multilayer films which are the claddings 12 and 13.

Therefore, while in a typical planar waveguide, in order to cause light incident upon a core to be totally reflected at an interface between a cladding and the core, it is necessary to form the cladding by using a material whose index of refraction is lower than that of the core, in this Embodiment 1, there is no limit on the index of refraction of the core 11 because it is not necessary to make the indexes of refraction $n_{12a}$ and $n_{12b}$ of the thin films 12a and 12b lower than the index of refraction $n_{11}$ of the core 11. Therefore, it is possible to form the planar waveguide 10 by using the core 11 made from an arbitrary material.

Next, operations will be explained.

Signal light 21 having a wavelength of $\lambda_{21}$ in a vacuum is propagated inside the core 11 at a propagation angle $\theta_{21}$.

Figure 2:
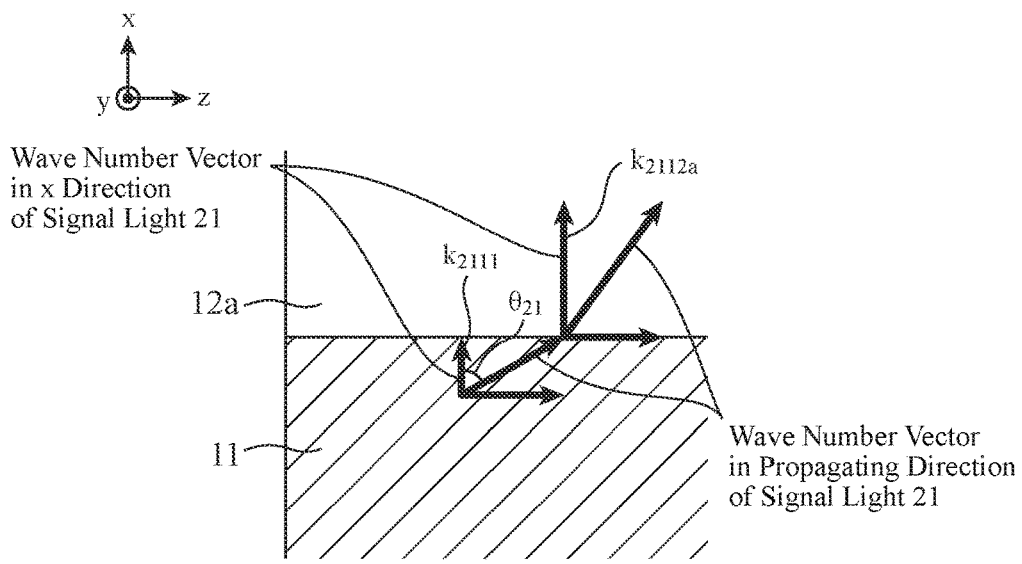
FIG. 2 is an explanatory drawing showing a wave number vector of signal light 21.

FIG. 2 is an explanatory drawing showing the wave number vector of the signal light 21.

When, as the wave number in the x direction of the signal light 21, a vertical component of the wave number in the core 11 is $k_{2111}$, a vertical component of the wave number in a thin film 12a is $k_{2112a}$, and a vertical component of the wave number in a thin film 12b is $k_{2112b}$, the vertical components $k_{2111}$, $k_{2112a}$, and $k_{2112b}$ of the wave number are defined as shown in the following equations (1) to (3). Hereafter, for the sake of simplicity, the vertical components $k_{2111}$, $k_{2112a}$, and $k_{2112b}$ of the wave number are expressed and abbreviated as the wave numbers $k_{2111}$, $k_{2112a}$, and $k_{2112b}$.

$$k_{2111} = \frac{2\pi n_{11} \cos \theta_{21}}{\lambda_{21}} \quad (1)$$

$$k_{2112a} = \frac{2\pi}{\lambda_{21}} \sqrt{n_{12a}^2 - n_{11}^2 \sin^2 \theta_{21}} \quad (2)$$

$$k_{2112b} = \frac{2\pi}{\lambda_{21}} \sqrt{n_{12b}^2 - n_{11}^2 \sin^2 \theta_{21}} \quad (3)$$

Assuming that the propagation angle $\theta_{21}$ of the signal light 21 takes discrete values within the planar waveguide 10, and there is a change of $\pi$ between the phase of incident light of the signal light 21 and that of reflected light of the signal light at the interface between the core 11 and the cladding 12, the propagation angle $\theta_{21}$ is determined by the equation (1) from the wave number $k_{2111}$ in the core 11 which satisfies the following equation (4). In the equation (4), m=0, 1, 2, 3, and . . . .

$$k_{2111} d_{11} = (m+1)\pi \quad (4)$$

The discrete values each of which can be taken by the propagation angle $\theta_{21}$ are referred to as zeroth-order, first-order, second-order, . . . propagation angles $\theta_{21}$ in descending order of the values of the propagation angle $\theta_{21}$.

Hereafter, a waveguide in which only signal light 21 having a zeroth-order propagation angle $\theta_{21}$ (referred to as "zeroth-order mode light" hereafter) can propagate is referred to as a single mode waveguide, and a waveguide in which signal light 21 having a low-order propagation angle $\theta_{21}$ (referred to as a "low-order mode light" hereafter) can propagate, but signal light 21 having a high-order propagation angle $\theta_{21}$ (referred to as "high-order mode light" hereafter) cannot propagate is referred to as a low-order mode waveguide.

Figure 3:
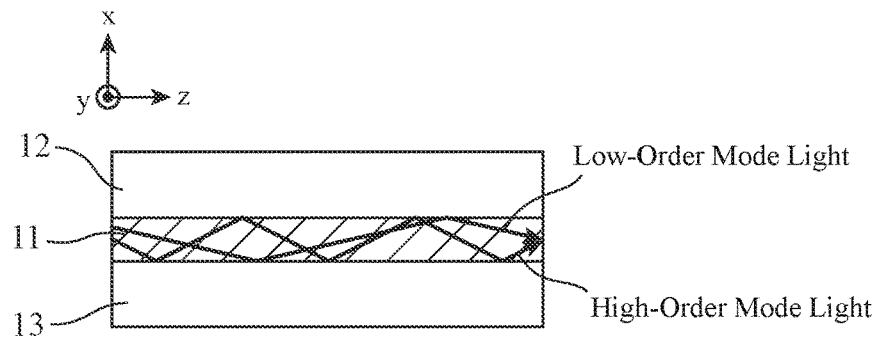
FIG. 3 is an explanatory drawing showing low-order mode light and high-order mode light.

FIG. 3 is an explanatory drawing showing low-order mode light and high-order mode light.

Here, combinations of the materials and the film thicknesses of the multilayer film which make the reflectivity to the signal light 21 become 99% or more when the signal light 21 is incident upon the cladding 12 from the core 11, exist innumerably, and the design can be performed freely.

However, because the thin films 12a and 12b included in the multilayer film provide a higher degree of scattering than that by typical glass, the loss at the time that the signal light 21 is propagated therethrough may be large. Therefore, it is necessary to use the thin films 12a and 12b satisfying a condition mentioned later.

Figure 4:
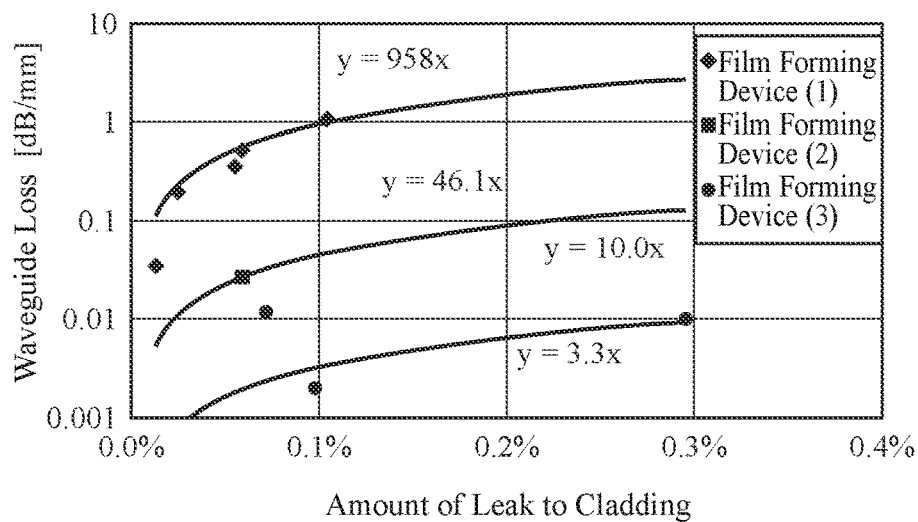
FIG. 4 is an explanatory drawing showing results of measurement of both the amount of leak of the signal light 21 to a cladding using total reflection and the waveguide loss in a case of joining the cladding to a core 11 made from Nd:YVO$_4$ by using each of film forming devices (1), (2), and (3) having different film forming methods.

FIG. 4 is an explanatory drawing showing results of measurement of both the amount of leak of the signal light 21 to a cladding using total reflection and the waveguide loss in a case in which the cladding is joined to the core 11 made from Nd:YVO$_4$ by using each of film forming devices (1), (2), and (3) having different film forming methods.

It is seen from FIG. 4 that the waveguide loss increases with increase in the amount of leak of the signal light 21 to the cladding, and there is a relation in which the amount of leak and the waveguide loss are directly proportional.

The amount of leak shows the ratio of the intensity of intrusion of the signal light 21 into the multilayer film to the total intensity of the propagating signal light 21, and certain energy exists in the inside of the multilayer film because a part of the signal light 21 is reflected inside the multilayer film even though the cladding 12 has reflectivity of 100% to the signal light 21.

At this time, the ratio of the energy existing in the inside of the core 11 and the energy existing in the inside of the multilayer film is defined as the amount of leak. This amount of leak differs for each mode.

Figure 5:
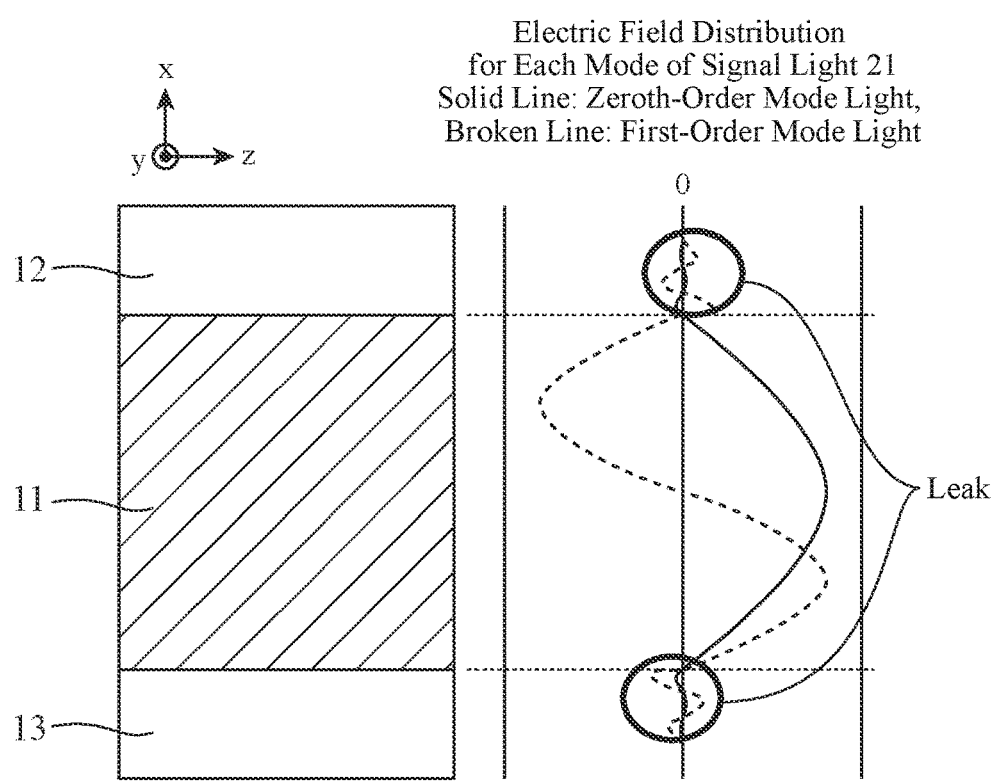
FIG. 5 is an explanatory drawing showing the electric field distribution and the leak of zeroth-order mode light in the signal light 21 and those of first-order mode light in the signal light.

FIG. 5 is an explanatory drawing showing the electric field distribution and the leak of the zeroth-order mode light in the signal light 21 and those of the first-order mode light in the signal light.

The assumption that there is a change of n between the phase of the incident light of the signal light 21 and that of the reflected light of the signal light at the interface between the core 11 and the cladding 12 is established well in a case in which the waveguide has a small amount of leak.

In certain mode, a condition under which the amount of leak of the signal light 21 is reduced satisfies the following equation (5). In the equation (5), l is an arbitrary integer.

$$k_{2112a}d_{12a} + k_{2112b}d_{12b} = l\pi \quad (5)$$

Figure 6:
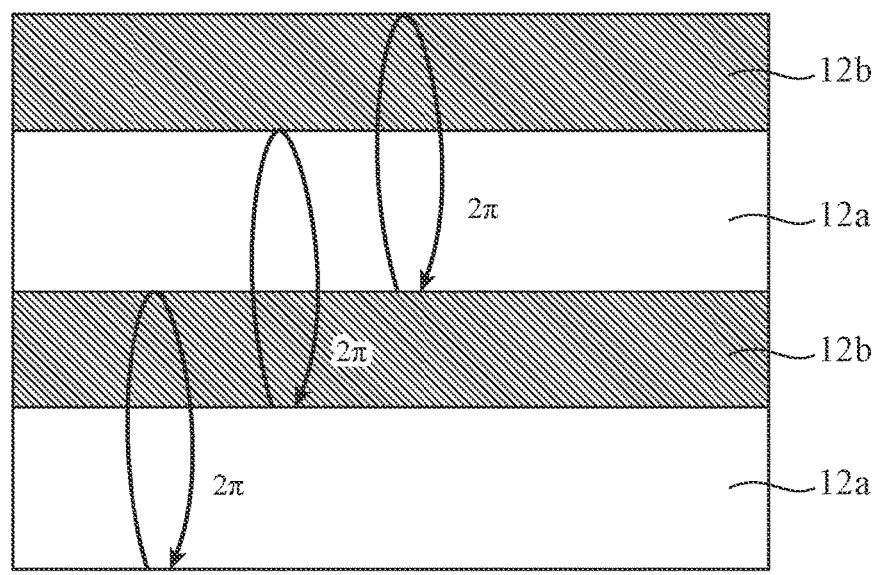
FIG. 6 is an explanatory drawing showing that a light path where light makes a round trip through one set of thin films 12a and 12b corresponds to a phase of $2\pi$.

In a multilayer film satisfying the equation (5), a light path where the signal light 21 makes a round trip through one set of thin films 12a and 12b out of the multiple films included in the multilayer film corresponds to a phase of $2\pi$, as shown in FIG. 6. Then, because constructive interference with the reflected light at the film interface is caused, high reflectivity can be implemented even in a case in which the layers of the multilayer film are few in number.

FIG. 6 is an explanatory drawing showing that the light path where the signal light makes a round trip through one set of thin films 12a and 12b, corresponds to a phase of $2\pi$.

However, because a certain amount of error is permitted in each of the film thicknesses $d_{12a}$ and $d_{12b}$ of the thin films 12a and 12b included in the multilayer film, high reflectivity can be implemented with a small number of layers even in a case in which the following formula (6) is satisfied as a formula showing the condition under which the amount of leak of the signal light 21 is reduced, like in the case of a multilayer film satisfying the equation (5). More specifically, the signal light 21 can be confined within the core 11 even in the case in which the index of refraction $n_{11}$ of the core 11 is lower than the indexes of refraction $n_{12a}$ and $n_{12b}$ of the thin films 12a and 12b included in the multilayer films which are the claddings 12 and 13.

Therefore, the film thicknesses $d_{12a}$ and $d_{12b}$ of the thin films 12a and 12b are determined to be ones satisfying the following formula (6).

$$\left(l - \frac{1}{4}\right)\pi < k_{2112a}d_{12a} + k_{2112b}d_{12b} < \left(l + \frac{1}{4}\right)\pi \quad (6)$$

In this Embodiment 1, by providing the claddings 12 and 13 which are the multilayer films including the thin films 12a and 12b having the film thicknesses $d_{12a}$ and $d_{12b}$ which satisfy the formula (6) as to the propagation angle $\theta_{21}$ of the zeroth-order mode light, the leak of the zeroth-order mode light in the signal light 21 can be suppressed and the waveguide loss can be reduced. Further, because the amount of leak of high-order mode light is large, the propagation of only low-order mode light is possible.

Hereafter, an example of designing, as the planar waveguide 10 through which only the low-order mode light can propagate, the planar waveguide 10 satisfying the formula (6) as to the propagation angle $\theta_{21}$ of the zeroth-order mode light will be explained.

Hereafter, a case is considered in which in the planar waveguide 10 including the core 11 having a thickness $d_{11}$ of 10 μm and an index of refraction $n_{11}$ of 1.42, the cladding 12 which is a multilayer film in which thin films 12a each having a film thickness $d_{12a}$ of 238 nm and an index of refraction $n_{12a}$ of 2.16 and thin films 12b each having a film thickness $d_{12b}$ of 1,278 nm and an index of refraction $n_{12b}$ of 1.45 are alternately layered, and the cladding 13 which is a multilayer film symmetrical to the cladding 12, the signal light 21 has a wavelength of 1.55 μm in a vacuum.

According to the equations (4) and (1), the propagation angle $\theta_{21}$ of the zeroth-order mode light is 1.5162 rad, the wave number $k_{2112a}$ in each thin film 12a is $6.61 \times 10^6$ m$^{-1}$, and the wave number $k_{2112b}$ in each thin film 12b is $1.23 \times 10^6$ m$^{-1}$.

Therefore, because both the light path length in each thin film 12a and the light path length in each thin film 12b are approximately $\pi/2$ when being converted into phases, a formula (6) is satisfied.

Figure 7:
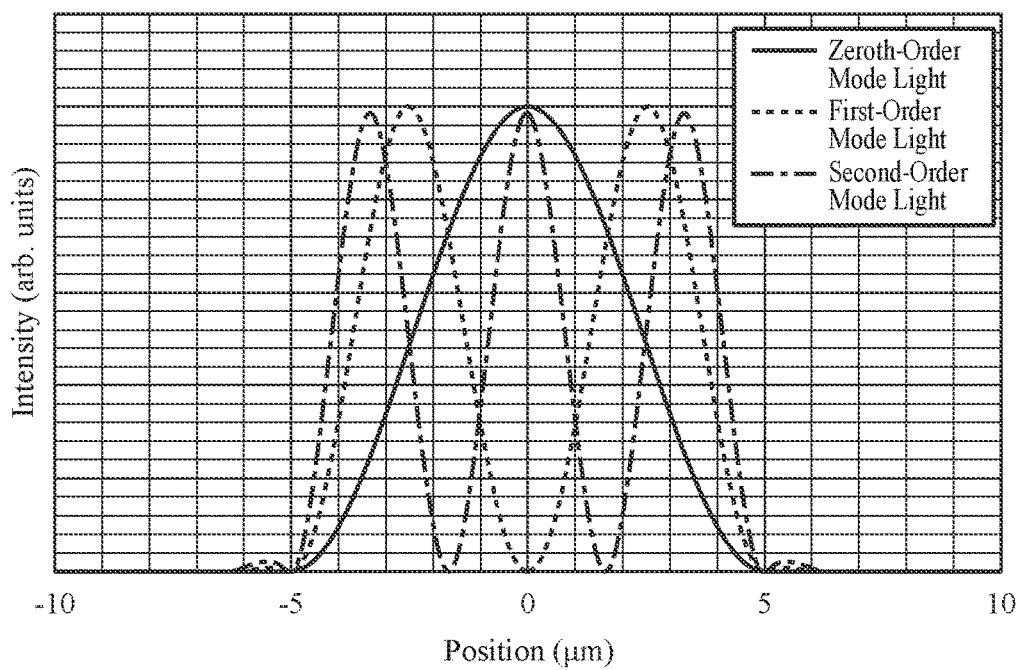
FIG. 7 is an explanatory drawing showing power distributions in TE mode.

FIG. 7 is an explanatory drawing showing power distributions in the TE mode.

In FIG. 7, the horizontal axis shows a position in a direction of the thickness of the planar waveguide 10, and the center in the thickness direction in the core 11 is at 0 μm. The vertical axis shows power density. In FIG. 7, power density is expressed as intensity.

In the example of FIG. 7, when calculation is performed by using a simulation or the like, the amount of leak of the zeroth-order mode light is 0.07%, the amount of leak of the first-order mode light is 0.31%, and the amount of leak of the second-order mode light is 0.84%.

In a case of using the film forming device (1) of FIG. 4, when calculation is performed, also as to the loss in each mode, by using a simulation, the loss in the zeroth-order mode light is 0.67 dB/mm, the loss in the first-order mode light is 2.97 dB/mm, and the loss in the second-order mode light is 8.05 dB/mm.

Therefore, the loss in the zeroth-order mode light, which is taken into consideration in the design, is reduced to a lower value than those in the first-order mode light and the second-order mode light, and the planar waveguide 10 is configured in which lower order mode can be established.

As the materials satisfying the illustrated indexes of refraction $n_{11}$, $n_{12a}$, and $n_{12b}$, for example, Er-doped aluminum fluoride glass which is the material of the core 11, Ta$_2$O$_5$ which is the material of each thin film 12a, and SiO$_2$ which is the material of each thin film 12b are provided.

As is clear from the above description, according to this Embodiment 1, because the configuration is provided in which the core 11 which is a flat plate through which light propagates, the cladding 12 which is a flat plate for reflecting the light in a state of being joined to the upper surface of the core 11, and the cladding 13 which is a flat plate for reflecting the light in a state of being joined to the lower surface of the core 11 are included, and each of the claddings 12 and 13 is a multilayer film in which multiple films made from different materials are layered, there is provided an advantage of being able to use a material having a low index of refraction as the material of the core 11.

By providing the claddings 12 and 13 which are the multilayer films including the thin films 12a and 12b having the film thicknesses $d_{12a}$ and $d_{22b}$ which satisfy the formula (6) as to the propagation angle $\theta_{21}$ of the zeroth-order mode light, the leak of the zeroth-order mode light in the signal light 21 can be suppressed and the waveguide loss can be reduced. Further, because the amount of leak of high-order mode light is large, the planar waveguide 10 through which only low-order mode light can propagate is provided.

Although the example of the multilayer films as the claddings 12 and 13 in each of which the two types of thin films 12a and 13a are alternately layered is shown in this Embodiment 1, the number of types of thin films included in each multilayer film is not limited to two, and each multilayer film can be one in which three or more types of thin films are layered.

In a case in which each multilayer film is one in which various types of thin films are layered, when the length of a light path extending from an interface at which light is incident upon a high refractive index layer from a low refractive index layer, to an interface at which light is incident upon a high refractive index layer from the next low refractive index layer is expressed as φ after being converted into a phase, the design is performed in such a way that the following formula (7) is satisfied.

$$\left(l - \frac{1}{4}\right)\pi < \phi < \left(l + \frac{1}{4}\right)\pi \quad (7)$$

Further, although the example in which the multilayer film which is the cladding 13 is symmetrical to the multilayer film which is the cladding 12 is shown in this Embodiment 1, the multilayer film which is the cladding 13 should just satisfy the formula (6), and its materials and film thickness can differ from those of the cladding 12.

In a case in which glass or the like having a low index of refraction does not have to be used as the material of the core 11, a cladding whose index of refraction is lower than that of the core 11 can be used as the cladding 12 or 13.

Embodiment 2.

Although in above-mentioned Embodiment 1, the example in which the signal light 21 is propagated through the core 11 is shown, in this Embodiment 2, signal light 21 and excitation light 31 are introduced to a core 11 will be explained.

Figure 8:
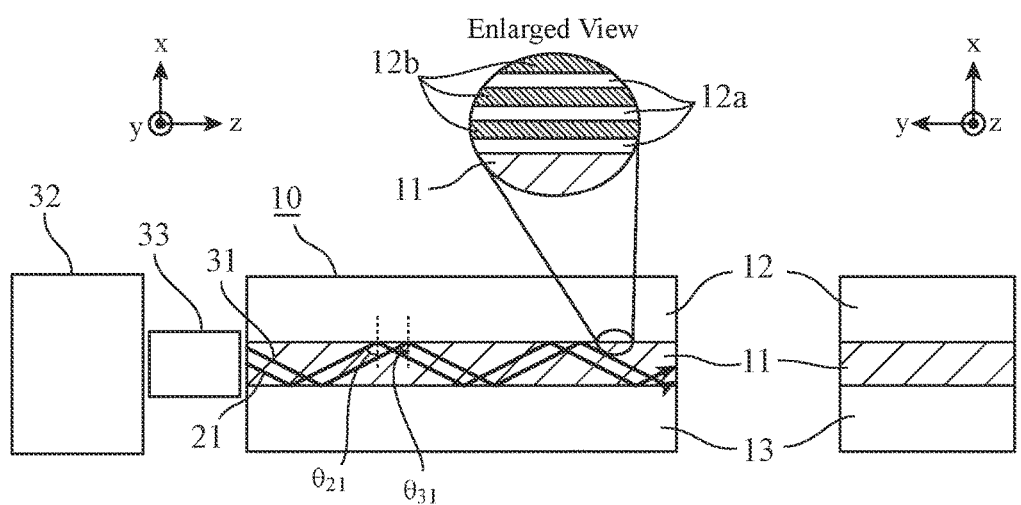
FIG. 8 is a schematic diagram showing a planar waveguide according to Embodiment 2 of the present invention.

FIG. 8 is a schematic diagram showing a planar waveguide according to Embodiment 2 of the present invention, and, in FIG. 8, because the same reference character strings as those shown in FIG. 1 denote the same components or like components, an explanation of the components will be omitted hereafter.

An excitation light source 32 emits excitation light 31.

An optical system 33 guides the excitation light 31 emitted from the excitation light source 32 to the core 11.

However, in a case in which it is possible to guide the excitation light 31 to the core 11 by arranging the excitation light source 32 close to the core 11, the optical system 33 can be omitted.

In this Embodiment 2, as the material of the core 11, a gain generation member that generates a gain by means of a radiative transition by absorbing the excitation light 31 and forming a population inversion is used.

For example, a gain generation member in which glass in which a rare earth element such as Er, Yb, Tm, or Nd is doped, crystals in which a rare earth such as Nd:YVO$_4$ is doped, ceramics in which crystals in which a rare earth element such as Yb:YAG is doped is used as a raw material, or crystals in which a transition metal such as Cr:YAG or Ti:Sapphire is doped generates a gain by means of a radiative transition by absorbing the excitation light 31 and forming a population inversion, is used.

In a case in which the core 11 is formed from such a gain generation member as above, the core has a function of amplifying the signal light 21 by absorbing the excitation light 31.

The excitation light 31 emitted from the excitation light source 32 has a wavelength $\lambda_{31}$ in a vacuum, and the excitation light 31 is propagated through the inside of the core 11 at a propagation angle $\theta_{31}$.

Further, the signal light 21 having a wavelength $\lambda_{21}$ in a vacuum is propagated through the inside of the core 11 at a propagation angle $\theta_{21}$.

When, as the wave number in an x direction of the excitation light 31, a vertical component of the wave number in the core 11 is $k_{3111}$, a vertical component of the wave number in a thin film 12a is $k_{3112a}$, and a vertical component of the wave number in a thin film 12b is $k_{3112b}$, the vertical components $k_{3111}$, $k_{3112a}$, and $k_{3112b}$ of the wave number are defined as shown in the following equations (8) to (10). Hereafter, for the sake of simplicity, the vertical components $k_{3111}$, $k_{3112a}$, and $k_{3112b}$ of the wave number are expressed and abbreviated as the wave numbers $k_{3111}$, $k_{3112a}$, and $k_{3112b}$.

$$k_{3111} = \frac{2\pi n_{11} \cos \theta_{31}}{\lambda_{31}} \quad (8)$$

$$k_{3112a} = \frac{2\pi}{\lambda_{31}} \sqrt{n_{12a}^2 - n_{11}^2 \sin^2 \theta_{31}} \quad (9)$$

$$k_{3112b} = \frac{2\pi}{\lambda_{31}} \sqrt{n_{12b}^2 - n_{11}^2 \sin^2 \theta_{31}} \quad (10)$$

Assuming that the propagation angle $\theta_{31}$ of the excitation light 31 also takes discrete values within the planar waveguide 10, like the propagation angle $\theta_{21}$ of the signal light 21, and there is a change of n between the phase of incident light of the excitation light 31 and that of reflected light of the excitation light at the interface between the core 11 and a cladding 12, the propagation angle $\theta_{31}$ is determined by the equation (8) from the wave number $k_{3111}$ in the core 11 which satisfies the following equation (11). In the equation (11), m=0, 1, 2, 3, and . . . .

$$k_{3111} d_{11} = (m+1)\pi \quad (11)$$

The discrete values each of which can be taken by the propagation angle $\theta_{31}$ are referred to as zeroth-order, first-order, second-order, . . . propagation angles $\theta_{31}$ in descending order of the values of the propagation angle $\theta_{31}$.

In certain waveguide mode, a condition under which the amount of leak of the excitation light 31 is reduced can be described as shown in the following formula (12), like in the case of the signal light 21.

$$\left(l - \frac{1}{4}\right)\pi < k_{3112a}d_{12a} + k_{3112b}d_{12b} < \left(l + \frac{1}{4}\right)\pi \quad (12)$$

In this Embodiment 2, by providing the claddings 12 and 13 which are multilayer films including thin films 12a and 12b having film thicknesses $d_{12a}$, and $d_{12b}$ which satisfy the formula (6) as to the propagation angle $\theta_{21}$ in zeroth-order mode and which satisfy the formula (12) as to the propagation angle $\theta_{31}$ in zeroth-order mode, the leak of the zeroth-order mode light in the signal light 21 and the leak of the zeroth-order mode light in the excitation light 31 can be suppressed and the loss in the gain waveguide can be reduced. Further, because the amount of leak of high-order mode light is large, the propagation of only low-order mode light is possible.

Hereafter, an example of designing, as the planar waveguide 10 which is a gain waveguide through which only low-order mode light can propagate, the planar waveguide 10 satisfying the formulas (6) and (12) as to the propagation angles $\theta_{21}$ and $\theta_{31}$ of the zeroth-order mode light will be explained.

Hereafter, a case is considered in which in the planar waveguide 10 including the core 11 having a thickness $d_{11}$ of 10 µm and an index of refraction $n_{11}$ of 1.42, the cladding 12 which is a multilayer film in which thin films 12a each having a film thickness $d_{12a}$ of 718 nm and an index of refraction $n_{12a}$ of 2.16 and thin films 12b each having a film thickness $d_{12b}$ of 965 nm and an index of refraction $n_{12b}$ of 1.45 are alternately layered, and the cladding 13 which is a multilayer film symmetrical to the cladding 12, the signal light 21 has a wavelength of 1.55 µm in a vacuum and the excitation light 31 has a wavelength of 940 µm in a vacuum.

As to the signal light 21, according to the equations (4) and (1), the propagation angle $\theta_{21}$ of the zeroth-order mode light is 1.516 rad, the wave number $k_{2112a}$ in each thin film 12a is 6.61×10$^6$ m$^{-1}$, and the wave number $k_{2112b}$ in each thin film 12b is 1.23×10$^6$ m$^{-1}$.

Therefore, because the light path length in each thin film 12a is 4.74 rad when being converted into a phase, the light path length in each thin film 12b is 1.19 rad when being converted into a phase, and the light path length is 5.93 rad in total, the formula (7) is satisfied.

As to the excitation light 31, according to the equations (11) and (8), the propagation angle $\theta_{31}$ of the zeroth-order mode light is 1.538 rad, the wave number $k_{3112a}$ in each thin film 12a is 10.9×10$^6$ m$^{-1}$, and the wave number $k_{3112b}$ in each thin film 12b is 2.0×10$^6$ m$^{-1}$.

Therefore, because the light path length in each thin film 12a is 7.81 rad when being converted into a phase, the light path length in each thin film 12b is 1.92 rad when being converted into a phase, and the light path length is 9.73 rad in total, the formula (12) is satisfied.

In the above-mentioned design example, when calculation is performed by using a simulation or the like, the amount of leak of the zeroth-order mode light in the signal light 21 is 0.07%, the amount of leak of the first-order mode light in the signal light is 0.29%, and the amount of leak of the second-order mode light in the signal light is 0.68%.

The amount of leak of the zeroth-order mode light in the excitation light 31 is 0.03%, the amount of leak of the first-order mode light in the excitation light is 0.14%, and the amount of leak of the second-order mode light in the excitation light is 0.36%.

Therefore, the loss in the zeroth-order mode light in the signal light 21 and the loss in the zeroth-order mode light in the excitation light 31 are reduced to lower values than those in the first-order mode light and the second-order mode light, and the planar waveguide 10 is configured in which lower order mode can be established.

As the materials satisfying the illustrated indexes of refraction $n_{11}$, $n_{12a}$, and $n_{12b}$, for example, Er-doped aluminum fluoride glass which is the material of the core 11, $Ta_2O_5$ which is the material of each thin film 12a, and $SiO_2$ which is the material of each thin film 12b are provided.

As is clear from the above description, according to this Embodiment 2, because the configuration is provided in which the core 11 that amplifies the propagating signal light 21 by absorbing the excitation light 31 and forming a population inversion, the cladding 12 that reflects the signal light 21 and the excitation light 31 in a state of being joined to the upper surface of the core 11, and the cladding 13 that reflects the signal light 21 and the excitation light 31 in a state of being joined to the lower surface of the core 11 are included, and each of the claddings 12 and 13 is a multilayer film in which multiple films made from different materials are layered, there is provided an advantage of being able to confine the signal light 21 and the excitation light 31 within the core 11 even though a material having a low index of refraction is used as the material of the core 11.

Further, in the above-mentioned design example, the excitation light 31 can be propagated in up to higher-order mode than that of the signal light 21, and this means that it is possible to use, as the excitation light source 32, a multimode excitation light source.

A multimode light source can achieve higher power than that of a single mode light source, and can configure a laser light source with a lower cost and higher power than those of a single mode light source.

Although the example of the multilayer films as the claddings 12 and 13 in each of which the two types of thin films 12a and 13a are alternately layered is shown in this Embodiment 2, the number of types of thin films included in each multilayer film is not limited to two, and each multilayer film can be one in which three or more types of thin films are layered.

In a case in which each multilayer film is one in which various types of thin films are layered, the design is performed in such away that the following formula (13) is satisfied, when the length of a light path extending from an interface at which light is incident upon a high refractive index layer from a low refractive index layer, to an interface at which light is incident upon a high refractive index layer from the next low refractive index layer is expressed as $\phi$ after being converted into a phase.

$$\left(l - \frac{1}{4}\right)\pi < \phi < \left(l + \frac{1}{4}\right)\pi \quad (13)$$

Further, although the example in which the multilayer film which is the cladding 13 is symmetrical to the multilayer film which is the cladding 12 is shown in this Embodiment 2, the multilayer film which is the cladding 13 should just satisfy the formulas (6) and (12), and its materials and film thickness can differ from those of the cladding 12.

In a case in which glass or the like having a low index of refraction does not have to be used as the material of the core 11, a cladding whose index of refraction is lower than that of the core 11 can be used as the cladding 12 or 13.

In addition, in this Embodiment 2, a laser in which the signal light 21 is confined also in a y direction can be configured instead of the planar waveguide 10 as a gain waveguide.

Embodiment 3.

Although in above-mentioned Embodiments 1 and 2, the example in which the signal light 21 is propagated through the core 11 is shown, in this Embodiment 3, an example in which signal light 21 emitted from a linearly polarized light source 22 is propagated through a core 11 will be explained.

Figure 9:
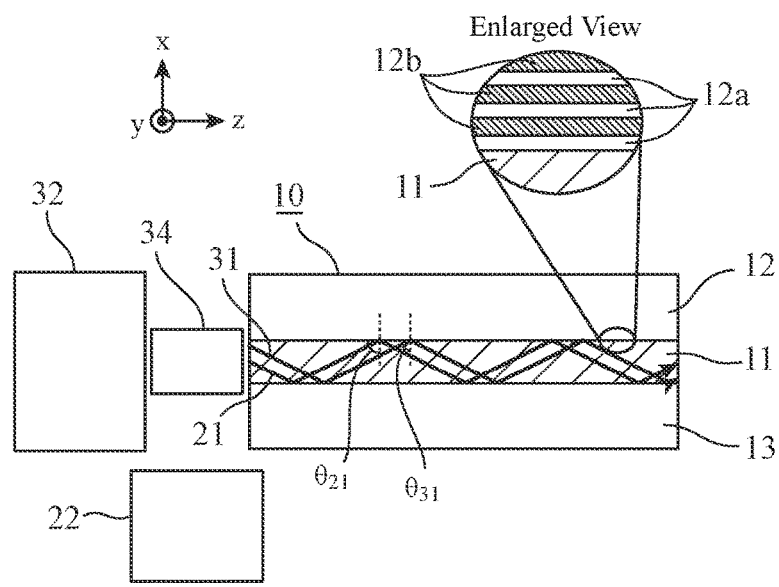
FIG. 9 is a schematic diagram showing a planar waveguide according to Embodiment 3 of the present invention.

FIG. 9 is a schematic diagram showing a planar waveguide according to Embodiment 3 of the present invention, and, in FIG. 9, because the same reference character strings as those shown in FIGS. 1 and 8 denote the same components or like components, an explanation of the components will be omitted hereafter.

The linearly polarized light source 22 is a signal light source that emits signal light 21.

An optical system 34 mixes excitation light 31 emitted from an excitation light source 32 and the signal light 21 emitted from the linearly polarized light source 22, and guides the signal light 21 and the excitation light 31 to the core 11.

In a case in which the signal light 21 is incident upon the core 11 with TE polarization, and isotropic materials such as glass are used as the core 11 and claddings 12 and 13, like in a conventional case, the polarization of the signal light 21 may not be held because of the occurrence of birefringence due to heat or stress.

In this Embodiment 3, although by providing the claddings 12 and 13 which are multilayer films including thin films 12a and 12b having film thicknesses $d_{12a}$ and $d_{12b}$ which satisfy the formulas (6) and (12) as to the propagation angles $\theta_{21}$ and $\theta_{31}$ of zeroth-order mode light, the leak of the zeroth-order mode light in the signal light 21 and the leak of the zeroth-order mode light in the excitation light 31 can be suppressed and the waveguide loss can be reduced, the polarization of the signal light 21 can be held by further controlling the amount of leak of TE polarized light and TM polarized light of the signal light 21, thereby controlling the propagation constants of the TE polarized light and the TM polarized light.

Hereafter, an example of designing, as the planar waveguide 10 in which the propagation constants of the TE polarized light and the TM polarized light are controlled to hold the polarization of the signal light 21, the planar waveguide 10 satisfying the formulas (6) and (12) as to the propagation angles $\theta_{21}$ and $\theta_{31}$ of the zeroth-order mode light will be explained.

Hereafter, a case is considered in which in the planar waveguide 10 including the core 11 having a thickness $d_{11}$ of 10 μm and an index of refraction $n_{11}$ of 1.42, the cladding 12 which is a multilayer film in which thin films 12a each having a film thickness $d_{12a}$ of 718 nm and an index of refraction $n_{12a}$ of 2.16 and thin films 12b each having a film thickness $d_{12b}$ of 965 nm and an index of refraction $n_{12b}$ of 1.45 are alternately layered, and the cladding 13 which is a multilayer film symmetrical to the cladding 12, the signal light 21 has a wavelength of 1.55 μm in a vacuum and the excitation light 31 has a wavelength of 940 μm in a vacuum.

In this case, because the design example is the same as that shown in above-mentioned Embodiment 2, the formulas (6) and (12) are satisfied and the amount of leak in low-order mode can be reduced to a low one, and therefore the signal light 21 and the excitation light 31 are propagated in low-order mode.

Although in above-mentioned Embodiments 1 and 2, the assumption is made that there is a change of π between the phase of incident light of the signal light 21 and that of reflected light of the signal light at the interface between the core 11 and the cladding 12, the amount of phase change actually differs dependently on the amount of leak of the light.

When the amount of phase rotation in the cladding 12 of the signal light 21 is $\phi_{2112}$ and the amount of phase rotation in the cladding 13 of the signal light is $\phi_{2113}$, the above-mentioned equation (4) is expressed correctly as the following equation (14). In the equation (14), m=0, 1, 2, 3, and . . . .

$$k_{2111}d_{11} + \phi_{2112} + \phi_{2113} = m\pi \quad (14)$$

When the amount of phase change differs between in TE mode and in TM mode, i.e., when the amount of phase rotation $\phi_{2112}$ differs from the amount of phase rotation $\phi_{2113}$, the wave number $k_{2111}$ in the core 11 differs dependently on the polarization.

Although in, for example, a polarization-holding optical fiber, the polarization is held by changing the propagation constant by changing the index of refraction for each polarization by means of stress or the like, in this Embodiment 3, the propagation constant is controlled by changing the amount of leak to each of the claddings 12 and 13.

In the above-mentioned design example, when calculation is performed by using a simulation or the like, $\phi_{2112} = \phi_{2113} \approx 0.01$ rad.

Because $k_{2222}d_{11} \approx \pi$ in the TE mode while a displacement of approximately 0.03 rad occurs in the TM mode, the propagation constant can be changed by approximately 1%.

As the materials satisfying the illustrated indexes of refraction $n_{11}$, $n_{12a}$, and $n_{12b}$, for example, Er-doped aluminum fluoride glass which is the material of the core 11, $Ta_2O_5$ which is the material of each thin film 12a, and $SiO_2$ which is the material of each thin film 12b are provided.

As is clear from the above description, according to this Embodiment 3, the polarization of the signal light 21 can be held by controlling the amount of leak of the TE polarized light and the TM polarized light of the signal light 21, thereby controlling the propagation constants of the TE polarized light and the TM polarized light.

Although the example of the multilayer films as the claddings 12 and 13 in each of which the two types of thin films 12a and 13a are alternately layered is shown in this Embodiment 3, the number of types of thin films included in each multilayer film is not limited to two, and each multilayer film can be one in which three or more types of thin films are layered.

Further, although the example in which the multilayer film which is the cladding 13 is symmetrical to the multilayer film which is the cladding 12 is shown in this Embodiment 3, the multilayer film which is the cladding 13 may just satisfy the formulas (6) and (12), and its materials and film thickness can differ from those of the cladding 12.

In a case in which glass or the like having a low index of refraction does not have to be used as the material of the core 11, a cladding whose index of refraction is lower than that of the core 11 can be used as the cladding 12 or 13.

In addition, in this Embodiment 3, a laser in which the signal light 21 is confined also in a y direction can be configured instead of the planar waveguide 10 as a gain waveguide.

Although in the example of FIG. 9, the excitation light source 32 and the linearly polarized light source 22 are arranged on the left of the planar waveguide 10 in the figure, the sources can be alternatively arranged on the right of the planar waveguide 10 in the figure, or above or below the planar waveguide 10 in the figure. However, there is a case in which an incidence optical system needs to be disposed between the linearly polarized light source 22 and the optical system 34 or the core 11.

While the invention has been described in its embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

The present invention is suitable for a planar waveguide in which claddings are joined to upper and lower surfaces of a core.

REFERENCE SIGNS LIST 10 planar waveguide, 11 core, 12 cladding (first cladding), 12a, 12b thin film, 13 cladding (second cladding), 14 cladding (third cladding), 15 cladding (fourth cladding), signal light, 22 linearly polarized light source, 31 excitation light, 32 excitation light source, 33 optical system, and 34 optical system.

What is claimed is:

1. A planar waveguide comprising:
a core which is a flat plate through which light propagates;
a first cladding which is a flat plate for reflecting the light in a state of being joined to an upper surface of the core; and
a second cladding which is a flat plate for reflecting the light in a state of being joined to a lower surface of the core,
wherein each of the first and second claddings is a multilayer film in which at least one of sets of multiple films made from different materials are layered,
wherein film thicknesses of multiple films belonging to an identical set are determined from a relation between wave numbers in the multiple films, and a light path where the light makes a round trip through the multiple films belonging to the identical set, and
wherein when a number of films belonging to the identical set is two, the film thicknesses of the two films are expressed by $d_a$ and $d_b$, respectively, vertical components of the wave numbers in the two films are expressed by $k_a$ and $k_b$, respectively, and the light path where the light makes a round trip through the two films is expressed by $l \times \pi$ (l is an integer equal to or larger than 1), the film thicknesses $d_a$ and $d_b$ of the two films are determined to be ones satisfying a following conditional formula:

$$\left(l - \frac{1}{4}\right) \times \pi < (k_a \times d_a) + (k_b \times d_b) < \left(l + \frac{1}{4}\right) \times \pi.$$

2. The planar waveguide according to claim 1, wherein the film thicknesses of the two films are determined to be ones satisfying the conditional formula, as to a zeroth-order propagation angle among propagation angles which are angles at each of which the light is incident upon each of the first and second claddings from the core.

3. The planar waveguide according to claim 1, wherein the core is a gain generation member for amplifying signal light which is propagating light by absorbing excitation light and forming a population inversion, and wherein the film thicknesses of the two films are determined to be ones satisfying the conditional formula, as to both a wave number determined from a wavelength of the excitation light, and a wave number determined from a wavelength of the signal light.

4. The planar waveguide according to claim 1, wherein the planar waveguide includes an excitation light source for emitting excitation light, and the excitation light emitted from the excitation light source is guided to the core.

5. The planar waveguide according to claim 1, wherein in the multilayer film, an amount of phase change of TE polarized light in the light differs from that of TM polarized light in the light.

6. The planar waveguide according to claim 5, wherein the core is a gain generation member for amplifying signal light which is propagating light by absorbing excitation light and forming a population inversion.

* * * * *